No. 841,059. PATENTED JAN. 8, 1907.
J. E. SHUTT.
GASKET.
APPLICATION FILED JAN. 3, 1906.
2 SHEETS—SHEET 1.
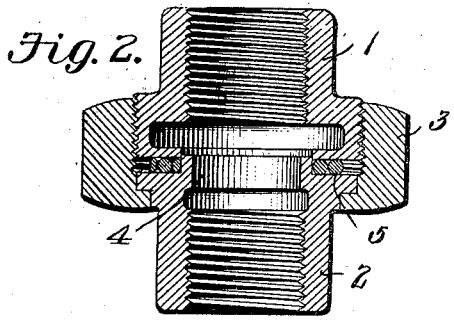
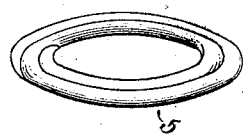
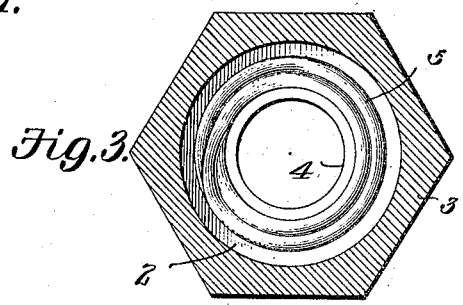
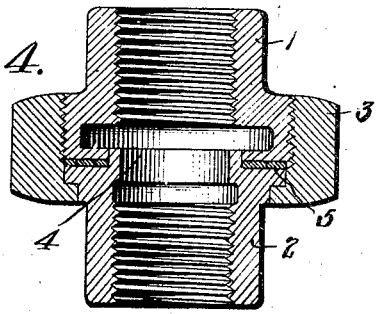
WITNESSES:
John E. Shutt, INVENTOR
By *C. A. Snow & Co.*
ATTORNEYS No. 841,059. PATENTED JAN. 8, 1907.
J. E. SHUTT.
GASKET.
APPLICATION FILED JAN. 3, 1906.
2 SHEETS—SHEET 2.
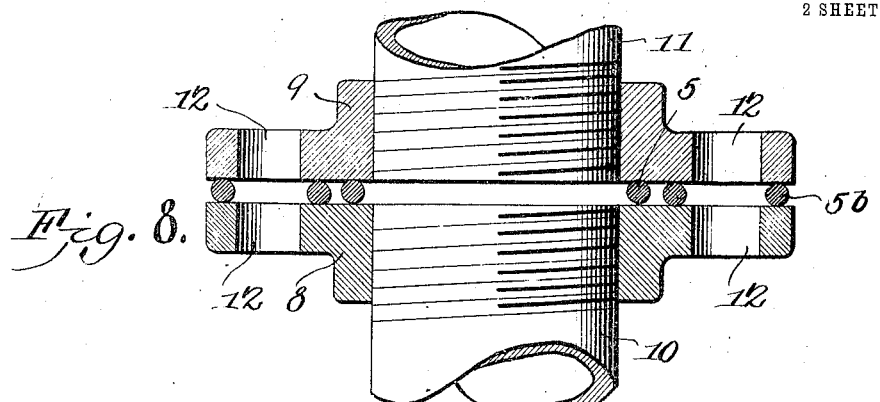
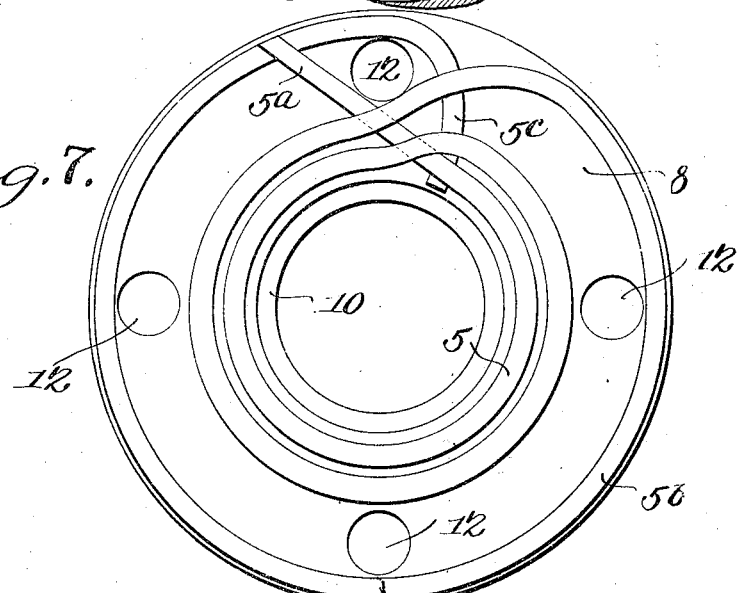
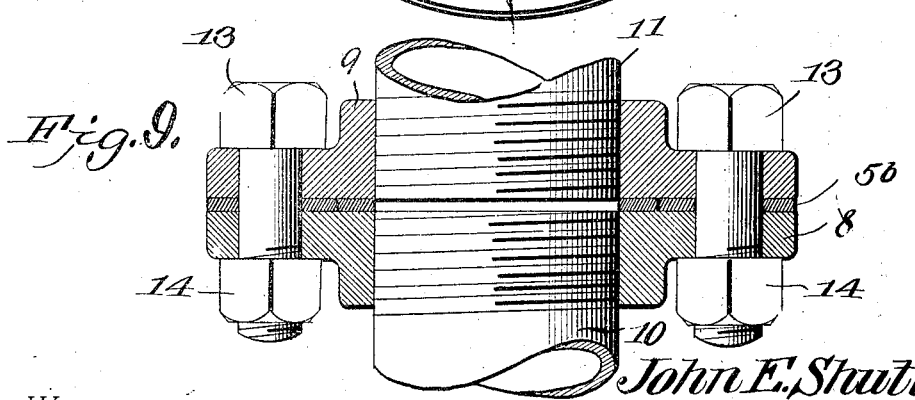
WITNESSES:
E. F. Stewart
H. A. Shepard
John E. Shutt,
INVENTOR.
By C. A. Snow & Co
ATTORNEYS

UNITED STATES PATENT OFFICE.

JOHN E. SHUTT, OF GANADO, TEXAS.

GASKET.

No. 841,059.     Specification of Letters Patent.     Patented Jan. 8, 1907.

Application filed January 3, 1906. Serial No. 294,442.

*To all whom it may concern:*

Be it known that I, JOHN E. SHUTT, a citizen of the United States, residing at Ganado, in the county of Jackson and State of Texas, have invented a new and useful Gasket, of which the following is a specification.

This invention relates to gaskets or packing-rings for pipe-joints and the like, and is more particularly an improvement upon another application filed by me in the United States Patent Office and bearing Serial No. 226,492.

Ordinarily gaskets and packing-rings are manufactured in standard sizes, and when making a connection if the workman does not possess the proper size of gasket it is necessary to delay the work until a gasket can be obtained from the shop. In view of this difficulty it is the essential object of the present invention to provide for the production of gaskets by the workman whenever desired without regard to the size and character of the joint.

With these and other objects in view the present invention consists in the combination and arrangement of parts hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawings, Figure 1 is a view of a length of material from which one of the gaskets of the present invention is formed. Fig. 2 is a sectional view of a pipe-coupling having a gasket applied thereto in accordance with the present invention, with the members of the joint in readiness to be tightened. Fig. 3 is a cross-sectional view of the joint with the gasket in elevation prior to tightening of the coupling members. Fig. 4 is a view similar to Fig. 2 after the coupling members have been tightened and the gasket thereby compressed. Fig. 5 is a detail perspective view of the gasket before being compressed. Fig. 6 is a detail perspective view of the gasket after being compressed. Fig. 7 is a view of a modification. Fig. 8 is a sectional view thereof preparatory to tightening the joint. Fig. 9 is a similar view showing the joint tightened and the gasket flattened.

Like characters of reference designate corresponding parts in all of the figures of the drawings.

For the purpose of illustrating the application of the present invention an ordinary form of pipe joint or coupling has been shown in the accompanying drawings and includes opposite coupling members 1 and 2. The member 2 has a collar 3 embracing the same and swiveled thereon with its front end portion projected beyond the coupling member 2 and internally threaded to engage the externally-threaded portion of the coupling member 1. As usual, the coupling member 2 has a forwardly-directed cylindrical flange 4, embracing the top thereof, which flange is embraced by the adjacent end of the coupling member 1 when the two members are assembled.

In carrying out the present invention a suitable length 5 of wire, as shown in Fig. 1, is cut from a roll or spool of wire, and this length of wire is wound a suitable number of times around the flange 4 of the coupling member 2, as best indicated in Fig. 3 of the drawings. After the gasket has thus been completed and fitted in place the coupling member 1 is associated with the swiveled ring 3, and the latter is turned so as to draw the two coupling members together, and thereby compress the coils of the wire into a flat gasket, completely filling the space between the two coupling members, the flange 4, and the ring 3. The wire 5 should be of lead or any of its alloys, so as to be sufficiently soft and pliable to enable the convenient severing of the same and winding of the severed portion into a spiral gasket and also to permit of the contiguous coiled portions flowing into one another under the compression incident to the tightening of the joint. By preference the ends of the wire are severed obliquely in reverse directions in order that the inner coiled portion of the gasket may snugly hug the flange 4 and in order that the outer end of the wire may merge into the outer face of the adjacent coil. The difference between the gasket prior to being compresed and after being compressed will be readily appreciated by reference to Figs. 5 and 6, wherein it will be noted that the initial form of the gasket is that of a spiral with its individual spirals separated, but in successive contact, while the final form of the gasket is that of a flat single-piece ring, which is due to the fact that the spirals are compressed between the members of the joint and are flowed together by the compression into a single-piece washer.

The advantages of the present invention resides in the fact that it is not necessary to depend upon a stock of gaskets, as a gasket of any size may be quickly produced in a simple and effective manner, it being merely necessary to have on hand a reel or bundle of wire from which any suitable lengths may be cut in accordance with the size of the desired gasket. By the present method of forming the gasket the heavy expense of maintaining a stock of standard washers of various sizes is eliminated, and the loss of time occasioned by returning to the shop for a washer is obviated, wherefore the present invention not only produces an effective washer, but also materially reduces the expense of carrying on the work of packing pipe-couplings and similar characters of joints.

Another arrangement of the present invention has been shown in Figs. 7, 8, and 9, which discloses a joint made up of a pair of duplicate collars 8 and 9, having threaded circular openings receiving pipe-sections 10 and 11 and also provided with bolt-openings 12. In tightening this character of joint the wire is wound a suitable number of times around the pipe-opening of the coupling member 8, care being taken to have the initial end portion 5ª of the wire disposed in substantially tangential relation with respect to the pipe-opening and its extremity adjacent the outer edge of the member 8. The several whirls of the wire pass over the end portion 5ª, and the outermost whirl 5ᵇ passes around at the outer sides of the bolt-openings 12 beneath the end portion 5ª, and its extremity 5ᵇ is pushed under the several whirls of the gasket inwardly toward the pipe-opening. Care should be taken to start the end 5ª between one of the bolt-openings 12 and the pipe-opening, and the other portion 5ᶜ should pass around and thence inwardly at the other side of the same bolt, whereby the bolt-opening is embraced by the opposite ends of the gasket. Any approved form of bolts 13 are passed through the bolt-openings, and suitable nuts 14 are fitted to the bolts, so as to draw the coupling members toward one another, and thereby compress the wire gasket, as shown in Fig. 9, so as to force adjacent whirls into engagement with one another in the same manner as hereinbefore described. By having the terminal 5ª pass beneath the inner whirls and over the outer whirl, with the terminal 5ᶜ passed beneath the several whirls, the ends of the gasket are interlocked with the whirls, and thereby held against looseness after the joint has been tightened. In the embodiment shown in Figs. 7, 8, and 9 the coupling members are drawn toward one another in a straight line, and therefore it is not necessary to coil the wire in any particular direction, whereas in Figs. 2, 3, and 4 the coupling members are drawn together by the action of a thread, and therefore it is preferred to coil the wire in the direction of the threads. Should there be any turning of either coupling member when tightening the same, the movement will be in the direction of the coils of the wire, which tends to hold the coils together rather than to spread them.

Having thus described the invention, what is claimed is—

A pipe-joint or the like having an unconfined wire wound spirally between the members of the joint, the outer whirl of the wire being expanded between the peripheries of the members of the joint, and means for clamping the joint members upon the wire to compress and spread it, the ends of the wire surrounding one of said means and overlapping.

In testimony that I claim the foregoing as my own I have hereto affixed my signature in the presence of two witnesses.

JOHN E. SHUTT.

Witnesses:
BRYANT GARRETT,
JAS. G. MAY.